United States Patent
Berthiaume et al.

(10) Patent No.: US 6,772,061 B1
(45) Date of Patent: Aug. 3, 2004

(54) SYSTEM, METHOD, AND APPARATUS FOR CONTROLLING VEHICLE PERFORMANCE

(75) Inventors: Yves Berthiaume, Palm Bay, FL (US); Dominic Dagenais, Canton de Shelford (CA)

(73) Assignee: Bombardier Recreational Products Inc., Saint-Bruno (CA)

( * ) Notice: Subject to any disclaimer, the term of this patent is extended or adjusted under 35 U.S.C. 154(b) by 341 days.

(21) Appl. No.: 09/932,445

(22) Filed: Aug. 20, 2001

Related U.S. Application Data

(60) Provisional application No. 60/226,097, filed on Aug. 18, 2000, and provisional application No. 60/229,339, filed on Sep. 1, 2000.

(51) Int. Cl.[7] ............................. G06F 19/00; G06G 7/70
(52) U.S. Cl. ................... 701/110; 701/115; 123/339.19; 307/10.5
(58) Field of Search ................................. 701/110, 103, 701/104, 105, 115, 1; 123/339.21, 339.1, 339.14, 339.19, 339.17, 438; 307/10.5

(56) References Cited

U.S. PATENT DOCUMENTS

| | | | |
|---|---|---|---|
| 4,166,514 A | 9/1979 | de Freminville et al. ... 180/167 |
| 4,177,516 A | 12/1979 | Mason ........................ 364/431 |
| 4,252,096 A | 2/1981 | Kennedy .................... 123/370 |
| 4,375,207 A | 3/1983 | Sieber et al. ............... 123/333 |
| 4,472,777 A | 9/1984 | Youngblood ................ 364/426 |
| 4,615,316 A | 10/1986 | Yasuhara .................... 123/333 |
| 4,660,528 A | 4/1987 | Buck .......................... 123/333 |
| 4,878,050 A | 10/1989 | Kelley ................... 340/825.06 |
| 4,993,627 A | * 2/1991 | Phelan et al. .............. 340/5.67 |
| 5,091,856 A | 2/1992 | Hasegawa et al. ..... 364/424.05 |
| 5,091,858 A | 2/1992 | Paielli ................... 364/431.12 |
| 5,113,427 A | 5/1992 | Ryoichi et al. ................ 379/57 |
| 5,200,900 A | 4/1993 | Adrain et al. .......... 364/431.12 |
| 5,345,902 A | 9/1994 | Kalail, Sr. et al. .... 364/424.045 |
| 5,619,412 A | 4/1997 | Hapka ........................ 123/335 |
| 5,769,051 A | 6/1998 | Bayron et al. .............. 123/335 |
| 5,803,043 A | 9/1998 | Bayron et al. |
| 5,818,330 A | * 10/1998 | Schweiger ............. 340/426.13 |
| 5,850,188 A | * 12/1998 | Doyle et al. ........... 340/825.69 |
| 5,869,908 A | * 2/1999 | Moczygemba et al. .... 307/10.5 |
| 6,253,143 B1 | 6/2001 | Silvernagle et al. .......... 701/93 |
| 6,512,974 B2 | * 1/2003 | Houston et al. ............ 701/115 |
| 6,539,299 B2 | * 3/2003 | Chatfield et al. ........... 701/104 |

OTHER PUBLICATIONS

Bombardier "Sea–Doo," Shop Manual 2000, 219100110, vol. 2, p. 05–02–4 to 05–02–8, $2^{nd}$ Trimester 2000.

Bombardier "Sea–Doo," Shop Manual 2000, 219100104, vol. 1, p. 08–02–3, 08–02–4, 08–06–1 to 08–06–3, $2^{nd}$ Trimester 2000.

Magazine, Power Boating Canada, vol. 15, No. 2, p. 91, 2000.

Dallas Semiconductor, DS2401, www.dalsemi.com, pp. 1–10, Oct. 21, 1999.

* cited by examiner

Primary Examiner—Willis R. Wolfe
Assistant Examiner—Johnny H. Hoang
(74) Attorney, Agent, or Firm—BRP Legal Services

(57) ABSTRACT

In a system according to one embodiment of the invention, an apparatus mounted onto a vehicle receives a control signal from a key. The control signal indicates one among a plurality of discrete and unitless vehicle performance levels. The vehicle performance (e.g. engine speed or fuel supply rate) is restricted according to the indicated vehicle performance level. Vehicle performance may also be restricted in a case where the key becomes separated from the apparatus (e.g. because the operator has become separated from the vehicle).

58 Claims, 20 Drawing Sheets

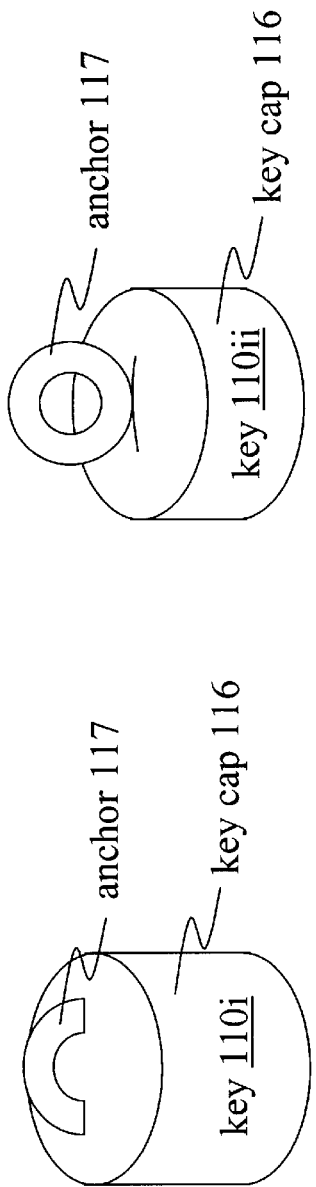
FIG. 3B
FIG. 3A
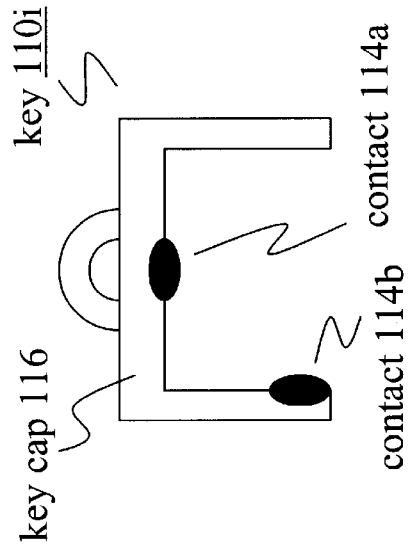
FIG. 3D
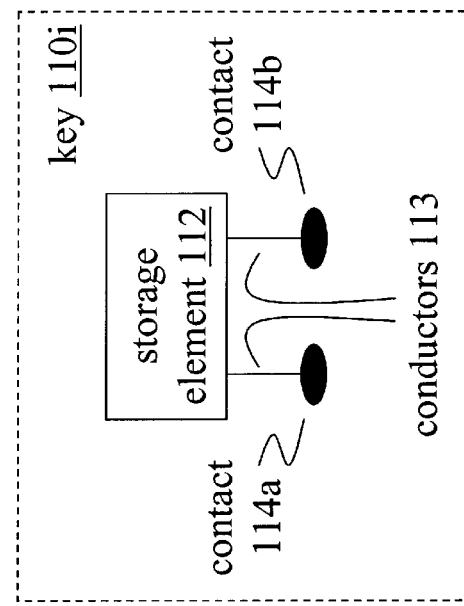
FIG. 3C

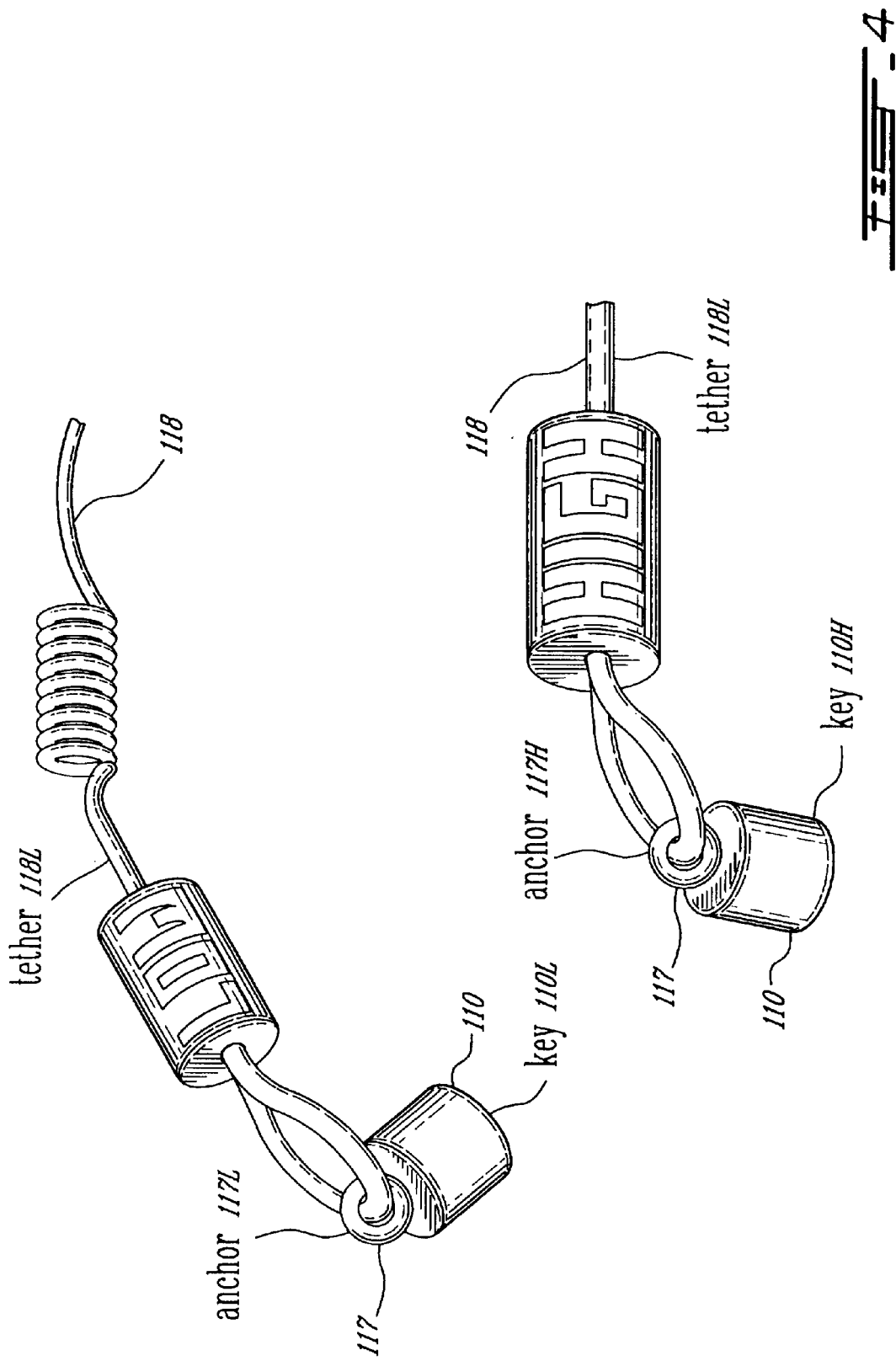

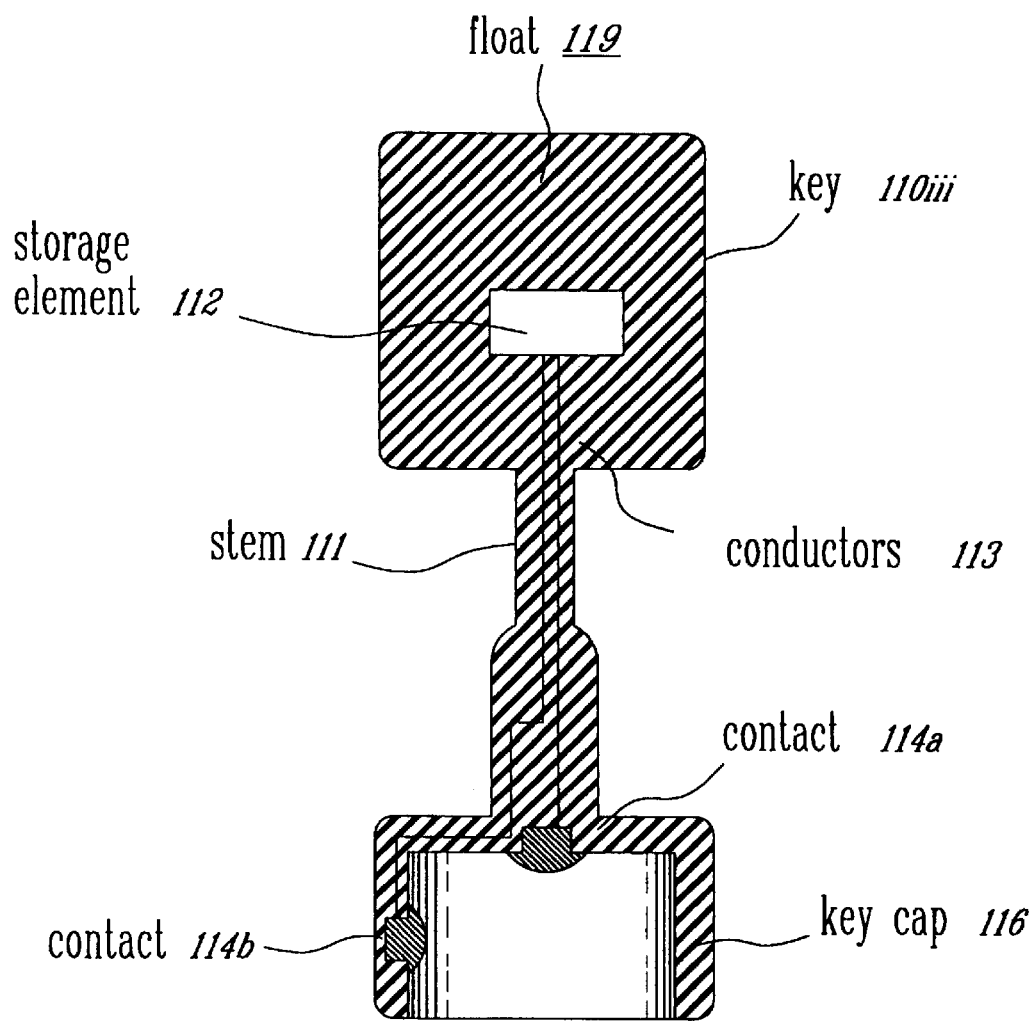

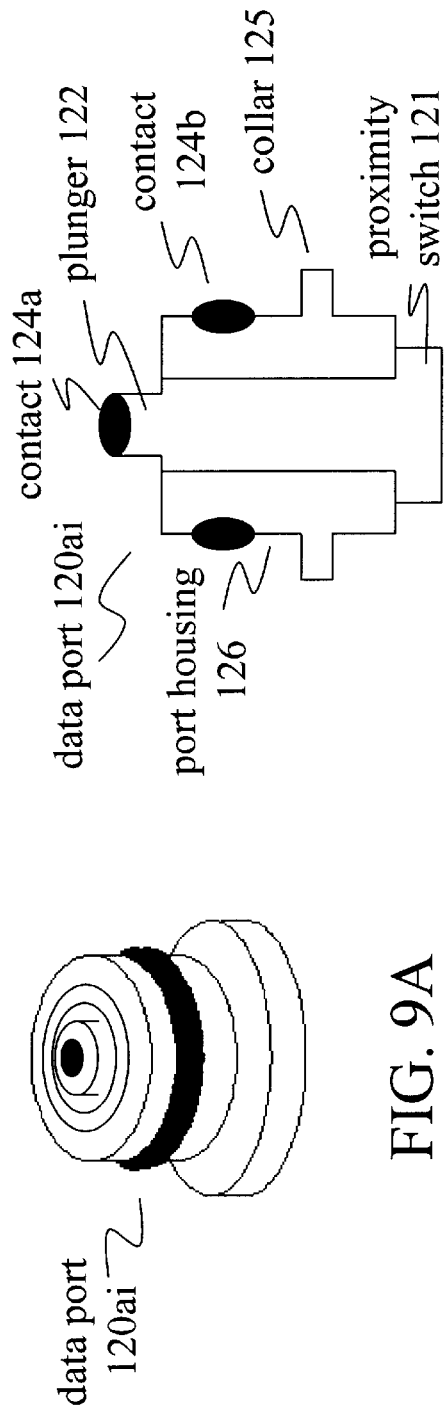
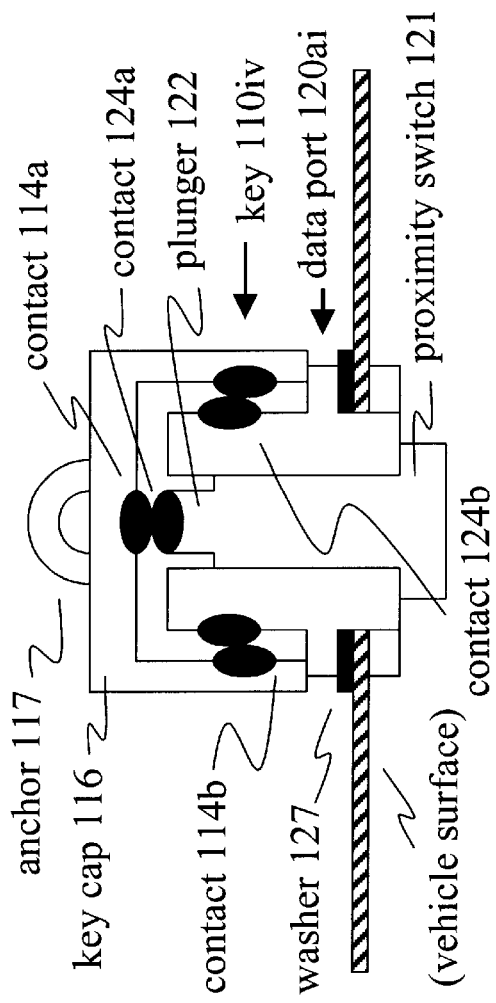
FIG. 9A
FIG. 9B
FIG. 9C

SYSTEM, METHOD, AND APPARATUS FOR CONTROLLING VEHICLE PERFORMANCE

RELATED APPLICATIONS

This application claims priority to provisional application No. 60/226,097, entitled "SYSTEM, METHOD, AND APPARATUS FOR CONTROLLING VEHICLE PERFORMANCE," filed Aug. 18, 2000, and to provisional application No. 60/229,339, entitled "SYSTEM, METHOD, AND APPARATUS FOR CONTROLLING VEHICLE PERFORMANCE," filed Sep. 1, 2000.

BACKGROUND OF THE INVENTION

1. Field of the Invention

This invention relates to control of vehicular operating parameters.

2. Background

It is desirable under some circumstances to limit engine performance in an automobile. For example, it may be desirable to prevent the rotational speed of an engine from exceeding a predetermined limit (i.e. as expressed in revolutions per minute (RPM)) during a break-in period of a new automobile. Likewise, it may be desirable to limit engine operation when a new or inexperienced driver will be operating the automobile. Similarly, it may be desirable to limit engine operation when the automobile is entrusted to a parking valet.

In one interface for limiting automobile engine operation, the automobile is provided with a keypad. An identification code is assigned to each driver, and a valid identification code must be entered into the keypad before the automobile will function. Once a valid code has been entered into the keypad, a processor retrieves a set of engine operating parameters (for example, maximum allowable RPM) corresponding to the identification code and forwards the parameters to an ignition control unit. In this manner, a code that permits unrestrained engine operation may be provided to the owner, while a code that permits only restricted engine operation may be provided to a novice driver or to a parking valet.

In another such control system, a set of engine operating parameters are encoded onto a key or a keychain unit that transmits them to an automobile-based receiver over a radio-frequency datalink. The receiver then forwards the engine operating parameters to an ignition control unit of the automobile.

Systems as described above may be inadequate for certain applications. For example, such systems may not be suited for use in other vehicles such as personal recreational vehicles (for example, personal watercraft). A system that requires the user to input a code before using the vehicle may be inconvenient to the user. Such a system may also allow unauthorized use of the vehicle to anyone who acquires knowledge of the code. Systems that require a keypad or a radio-frequency link may also be too expensive, delicate, and/or unreliable for some applications.

A key or keychain unit that includes encoded engine operating parameters may be useful only with respect to one particular vehicle configuration, and the task of selecting appropriate engine operating parameters to achieve a desired result may also be nonintuitive to many users. Moreover, systems as described above do not address other concerns that may a rise with respect to personal recreational vehicles, such as controlling vehicle operation in case of the user's separation from the vehicle.

SUMMARY

An apparatus for controlling vehicle performance includes a data port to receive a control signal from a key. A control unit is coupled to the data port to output a vehicle operating parameter that is based on information corresponding to a vehicle performance level indicated by the control signal.

BRIEF DESCRIPTION OF THE DRAWINGS

FIGS. 3A–D show various views of keys 110$i$ and 110$ii$ according to embodiments of the invention;

FIG. 4 shows two keys 110L and 110H according to embodiments of the invention with tethers; and FIG. 5 shows a key 110$iii$ according to an embodiment of the invention;

FIG. 9A–C show a data port 120$ai$ according to an embodiment of the invention, a cross-sectional view of data port 120$ai$, and a cross-sectional view of data port 120$ai$ mounted on a vehicle surface and receiving a key 110$iv$, respectively;

DETAILED DESCRIPTION

It may be desirable to limit engine operating performance in vehicles other than automobiles. In the case of recreational vehicles such as all-terrain vehicles (ATVs) and personal watercraft, for example, it may be desirable to limit the performance of the vehicle for certain operators or operating conditions.

Additionally, it may be desirable to restrict engine performance when vehicles are rented for temporary recreational use. It may also be desirable to limit other vehicle operating parameters (for example, vehicle turning radius) in addition to or instead of engine operating parameters. Moreover, it may be desirable to equip a vehicle with a capability to automatically shut down or idle the engine if the operator should become separated from the vehicle. For example, such capability may be desirable for a personal recreational vehicle such as a personal watercraft, a snowmobile, or an all-terrain vehicle. For ease of use, it may be desirable for a single apparatus or system to provide vehicle performance limitation capabilities together with such automatic engine shut down or idle control.

Existing keys for transmitting engine operating parameters are restricted to use with a single vehicle. It may be desirable for one key to exhibit vehicle performance limiting activity for more than one vehicle. For example, it may be desirable for a single key to cause, similar vehicle performance limitation in several vehicles within a rental fleet, regardless of the comparative characteristics of each vehicle. Even in a case where the key is only associated with a single vehicle (e.g. for an operator-owned vehicle), it may be desirable to provide simple, discrete, and unitless performance levels (e.g. a range of levels from 1 (beginner) to 4 (expert)) rather than requiring the customer to indicate specific engine operating parameters in units such as RPM. Besides simplifying the selection process for the customer, a key indicating such a discrete performance level may also be easier or less expensive to fabricate, duplicate, and/or replace (e.g. if stolen or misplaced). Accordingly, several advantages may be realized by using a new approach to controlling vehicle performance as disclosed herein.

Figure 1:
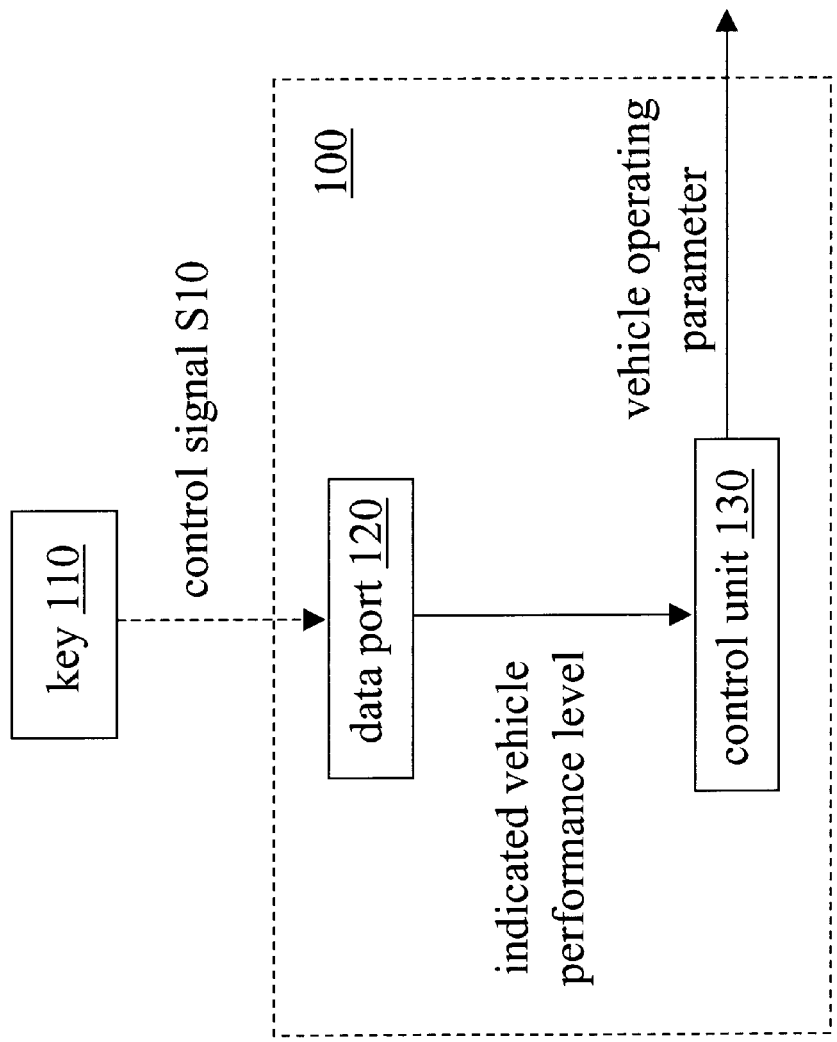
FIG. 1 shows a block diagram of a system according to an embodiment of the invention.

FIG. 1 shows a system for controlling vehicle performance according to an embodiment of the invention. During an operation of this system, key 110 transmits a control signal S10 to apparatus 100. Control signal S10 indicates one among a plurality of vehicle performance levels, and key 110 transmits this signal over a communications link that may be mechanical, magnetic, electrical, and/or wireless (e.g. radio-frequency or optical). Apparatus 100 receives control signal S10 through data port 120. Control unit 130 receives the indicated vehicle performance level and outputs a vehicle operating parameter that is based at least in part on operating parameter information that corresponds to the indicated vehicle performance level.

In one implementation, the signal that conveys the indicated vehicle performance level to control unit 130 may be essentially the same as control signal S10. In another case, data port 120 may receive an information signal in one form (e.g. magnetic or electromagnetic) and output the same signal in another form (e.g. electrical). In another implementation, the information transferred by the data signal that conveys the vehicle. performance level may be different than the information transferred by the performance level carrier signal. For example, data port 120 may perform an operation such as amplification, thresholding, decoding, demodulation, or error correcting on the performance level carrier signal received from key 110 in order to produce the data signal that conveys the vehicle performance level to data processing unit 130.

Control unit 130 may comprise one or more microprocessors, microcontrollers, application-specific integrated circuits (ASICs), or other arrays of logic elements. For example, control unit 130 may comprise an embedded microcontroller such as one of the MC68HC05 family (Motorola, Inc., Schaumberg, Ill.). In an exemplary implementation, control unit 130 may comprise the Electronic Control Unit (ECU) or Multi-Purpose Electronic Module (MPEM) of a Sea-Doo™ RX DI 2000 personal watercraft (Bombardier Recreational Products, Montreal, Quebec, Canada). Alternatively, control unit 130 may comprise a mechanical linkage for processing a mechanical data signal outputted by data port 120. Control unit 130 may control the vehicle operation directly (e.g. by controlling engine fuel supply, disabling a starting circuit, etc.) and/or indirectly (e.g. by supplying ignition values to an ignition control module, injection values to a fuel injection module, etc.). Control unit 130, an engine fuel supply control module, a starting circuit, an ignition control module, and a fuel injection module may be implemented separately, or one or more of these units may be integrated into a single module. Depending on the particular application, one or more of these units may not be present.

Figure 2:
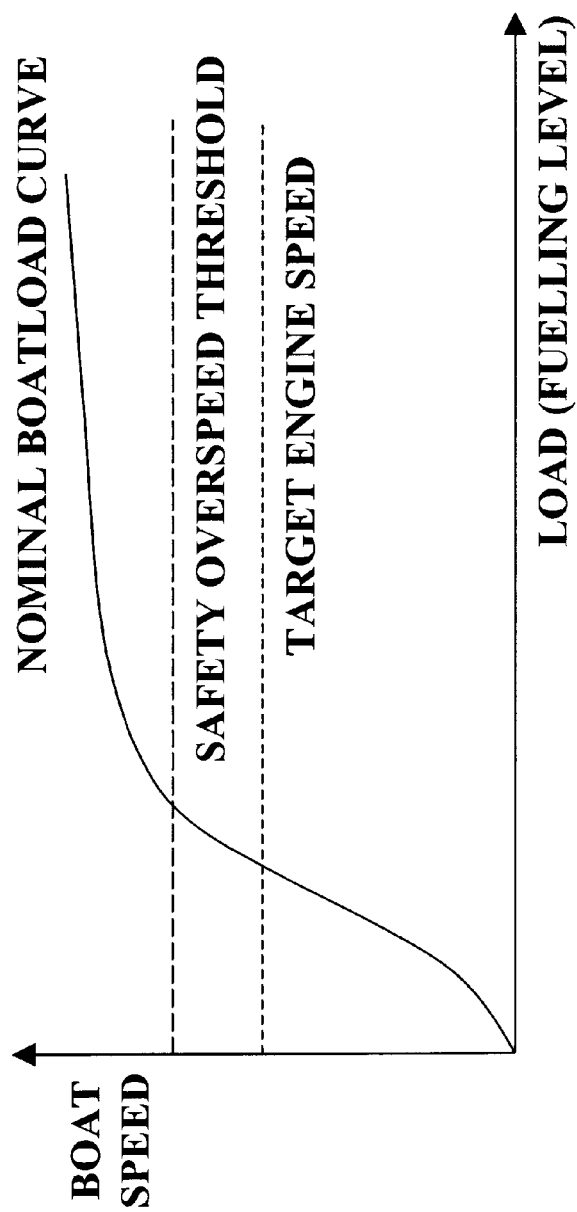
FIG. 2 shows an engine control curve.

FIG. 2 shows one example of an engine control curve for a watercraft, presented here as a relation between speed and fueling level. A system as described in FIG. 1 may be used in such a vehicle to control vehicle performance. For example, the indicated vehicle performance level received by data port 120 may correspond to the target engine speed shown in FIG. 2. Until such speed is reached, the engine may be permitted to operate in any accelerating mode (e.g. even under wide-open-throttle conditions). When the target speed is reached, a proportional-only controller may be used to reduce the amount of fuel provided to the engine. This controller may be bidirectional (capable of increasing or reducing fuel supply) or unidirectional (only capable of reducing fuel supply).

It may be desirable to incorporate a certain amount of hysteresis in the fuel supply control in order to avoid instability, e.g. from rich-lean excursions when engine speed is changing rapidly. As such operation may cause lean running, it may also be desirable to ensure that the engine is not prone to lean detonation at or near the target speed. Additionally, it may be desirable to provide timing offset maps for ignition timing and start of an injection event. In other implementations, proportional controllers having integral and/or differential response terms may be used.

As shown in FIG. 2, a safety overspeed threshold may also be provided, e.g. as a delta from the target speed value. In such case, performance of the vehicle may be further controlled (e.g. by applying a more restrictive engine cutoff) in the event that the safety overspeed threshold is reached or exceeded. For example, a cylinder cut-out may be triggered in the event that this threshold is exceeded (e.g. the valves to one or more engine cylinders may be deactivated). For a personal watercraft, for example, in a case of loading and unloading of the impeller (e.g. as may occur during wave jumping), such control may provide a faster and more definitive response than a proportional-only controller.

Figure 6A:
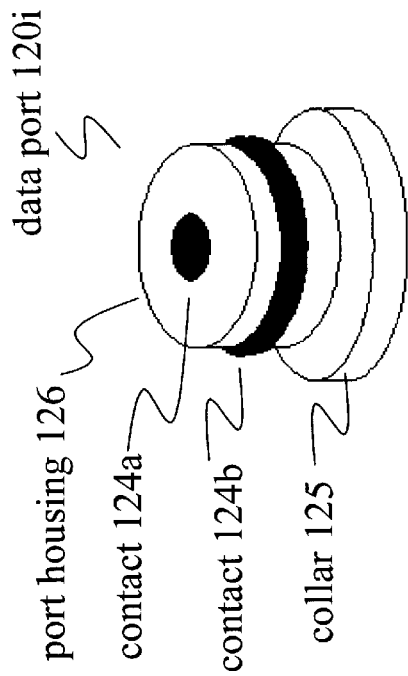
FIGS. 6A–C show various views of a data port 120$i$ according to an embodiment of the invention.

Key 110 may be a key, ring, keychain device, or other accessory or wearable item. FIGS. 3A and 3B show keys 110*i* and 110*ii* according to exemplary embodiments of the invention. Such a key may be fabricated having one or more indicators (e.g. an indicator color, an alphabetic and/or numeric label, etc.) to indicate the corresponding performance level of the key. Key cap 116, which may be constructed of rubber or a plastic material, has a size and shape to attach securely and detachably to a data port 120*i* (as shown in FIG. 6A and as described below). Keys 110*i* and 110*ii* also include an anchor 117 to which a tether may be fastened as described below.

FIG. 3C shows a schematic diagram for key 110*i*, which transmits control signal S10 over an electrical connection.

Storage element 112 stores the vehicle performance level and possibly other information as discussed herein. In one implementation, storage element 112 includes a two-wire silicon serial number device such as Dallas Semiconductor Part No. DS2401. In other implementations, storage element 112 may comprise a nonvolatile random-access memory (RAM) or read-only memory (ROM) device that may be nonprogrammable, one-time-only programmable, or reprogrammable (e.g. flash or ferroelectric RAM). Through conductors 113, storage element 112 is connected to contacts 114a and 114b. These contacts may be formed from a conductive material that is suitable to the operating environment (for example, conducting pads that are made of or plated with non-corroding materials for humid or marine environments). FIG. 3D is a cross-sectional view of key 110i which shows an exemplary placement of contacts 114a and 114b.

FIG. 4 shows two examples of keys 10 connected to tethers. Key 110L is coded with a low vehicle performance level, while key 110H is coded with a high vehicle performance level. For each key, one end of a tether 118 is connected to anchor 117. The other end of tether 118 (not shown) has a latch that may be securely attached to the vehicle operator's clothing, belt, or (e.g. for watercraft use) personal flotation device such as a life vest or jacket. As shown for tether 118L in FIG. 4, at least a part of the body of tether 118 may be coiled or otherwise elastic to provide unrestricted operator movement without excessive cable slack. In a system for use with watercraft, tether 118 may also include a float as shown which may be color coded or otherwise marked to indicate the vehicle performance level coded onto key 110.

FIG. 5 shows a cross-sectional view of a key 110iii according to another embodiment of the invention. In this embodiment, storage element 112 is enclosed within a float 119. In this anchorless embodiment of key 110, one end of a tether 118 (e.g. as shown in FIG. 4) may be connected to key 110iii about stem 111.

Data port 120 may be any transducer or transponder suitable for receiving control signal S10 from key 110, e.g., by at least one among a mechanical, electrical, magnetic, or wireless (e.g. optical or radio-frequency) datalink. For example, a surface or edge of key 110 may have indentations and/or protrusions such that when key 110 is placed in a predetermined physical relation to data port 120 (e.g. inserted into a slot of data port 120), these features of key 110 communicate with spring-loaded portions of data port 120 via mechanical contact (or the lack thereof). Alternatively, key 110 may include one or more magnetically active (or sensitive) areas that communicate with correspondingly sensitive (or active) areas of data port 120 (e.g. in a mechanical, electrical, or electronic fashion) when key 110 is placed in a predetermined physical relation thereto.

For a magnetic link, data port 120 may comprise one or more reed switches or Hall effect sensors, and information may be communicated by a spatial arrangement of magnetized areas. For an-optical or radio-frequency link, key 110 may be self-powered and/or powered by a power signal and/or by an excitation caused by field or beam emissions from data port 120 or another unit in proximity to data port 120, and information may be communicated over the link by a modulation of a carrier signal over time. For an electrical or mechanical link, control signal S10 may be transferred via a spatial arrangement of electrical or mechanical contacts; alternatively, this signal may be communicated through one or more contacts over time.

In another implementation, key 110 communicates control signal S10 to data port 120 electrically. In an exemplary embodiment, key 110 is a key such as the Learning Key™ (Bombardier Recreational Products, Montreal, Quebec, Canada) as provided for use with the Sea-Doo™ RX DI 2000 personal watercraft. Such a key may also be used with other vehicles, including a snowmobile such as the Ski-Doo™ model year 2000 MXZ (Bombardier Recreational Products). In an exemplary implementation, data port 120 comprises a pair of electrical contacts, one contact providing a power and/or signal terminal and the other contact providing a ground potential; in such case, control signal S10 may be received by data port 120 as a serial bit stream. For example, data port 120 may be a Digitally Encoded Security System™ (DESS™) post as may be found on the Sea-Doo™ RX DI 2000 personal watercraft or another vehicle.

Figure 6C:
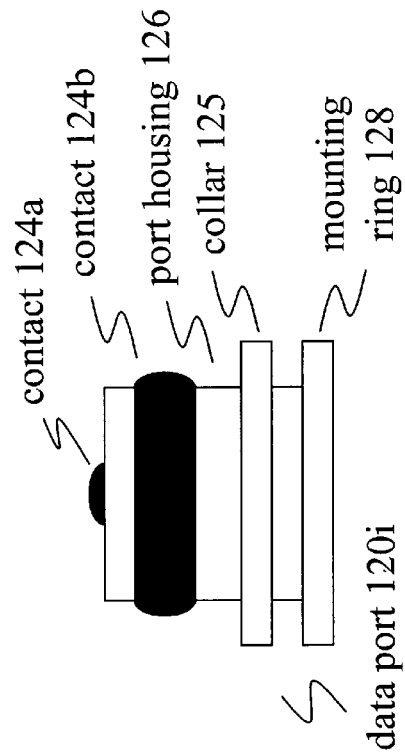
Figure 6B:
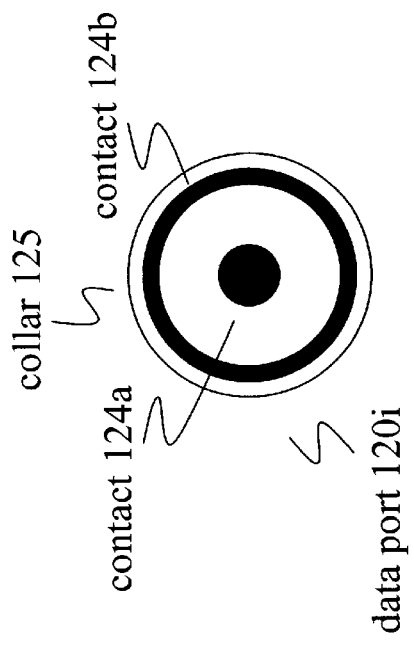

FIG. 6A shows a data port 120i suitable for use in an apparatus according to an embodiment of the invention. Contacts 124a and 124b are arranged to receive the control signal S10 from key 110. In this example, contact 124b is a conductive ring that allows control signal S10 to be received without regard to the orientation of key 110 upon data port 120i. Port housing 126 provides support for contacts 124a and 124b and also encloses the conductors 123 (shown in FIG. 7A) which carry the information received by the contacts. Together with mounting ring 128 as shown in FIG. 6C, collar 125 provides mounting support for data port 120i as described below. FIGS. 6B and 6C show top and side views of data port 120i, respectively.

Figure 7A:
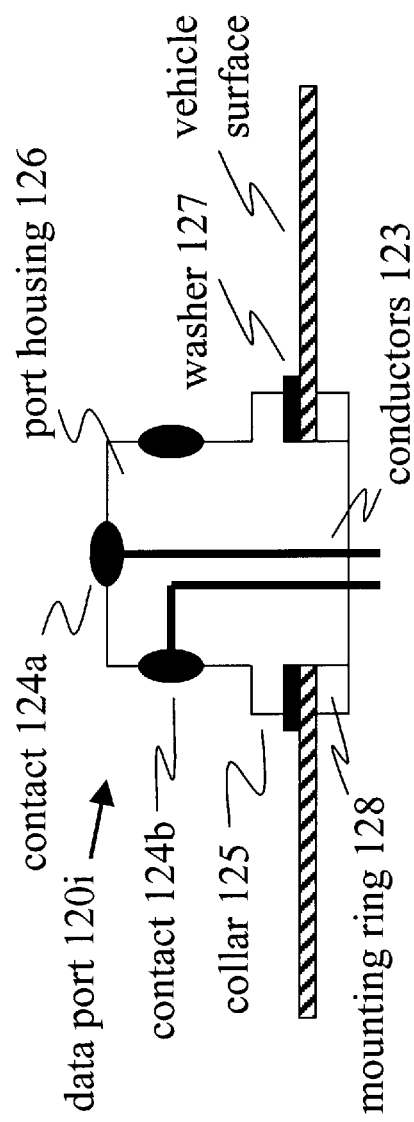
FIGS. 7A and 7B show a data port 120$i$ according to an embodiment of the invention as mounted on a vehicle surface and as mounted and receiving a key 110$iv$, respectively.
Figure 7B:
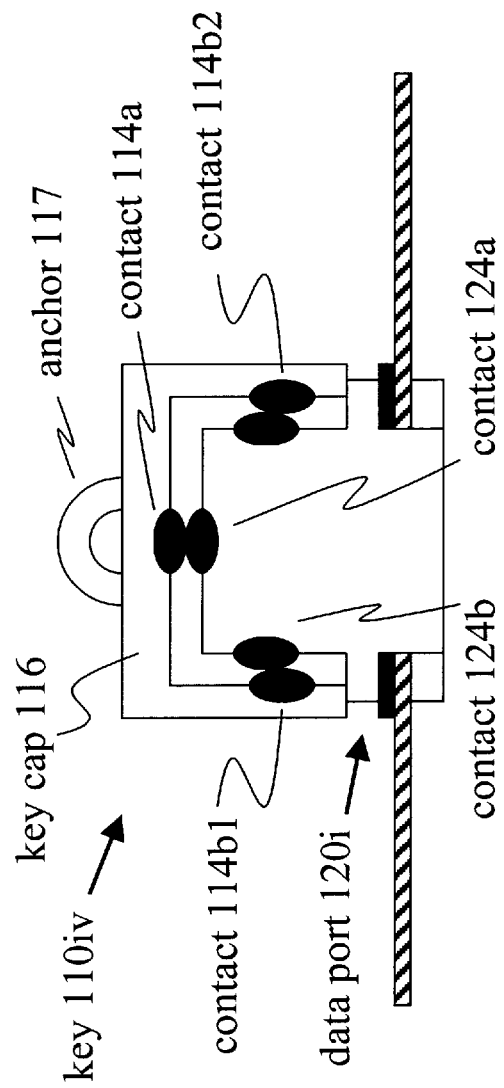

FIG. 7A shows a cross-sectional view of data port 120i as mounted through a hole in the surface of a vehicle (e.g. in the vehicle dashboard or in a similarly convenient location). In this example, data port 120i is secured at least in part by compression of the vehicle surface between collar 125 and mounting ring 128. For example, mounting ring 128 may be attached securely to port housing 126 by threads, by friction, or by a pin or set screw. A washer 127 may also be provided as shown between collar 125 and the vehicle surface to dampen vibration and/or to provide an airtight or watertight seal between the interior and exterior of the vehicle. FIG. 7B shows a key 110iv mounted for operation upon data port 120i, contacts 114a and 114b being in direct contact with contacts 124a and 124b, respectively. In this implementation 110iv of key 110, contacts 114b1 and 114b2 provide a mechanically balanced connection to contact 124b; these contacts may be in direct electrical circuit, or one of them may be electrically isolated or part of a different circuit.

Figure 8:
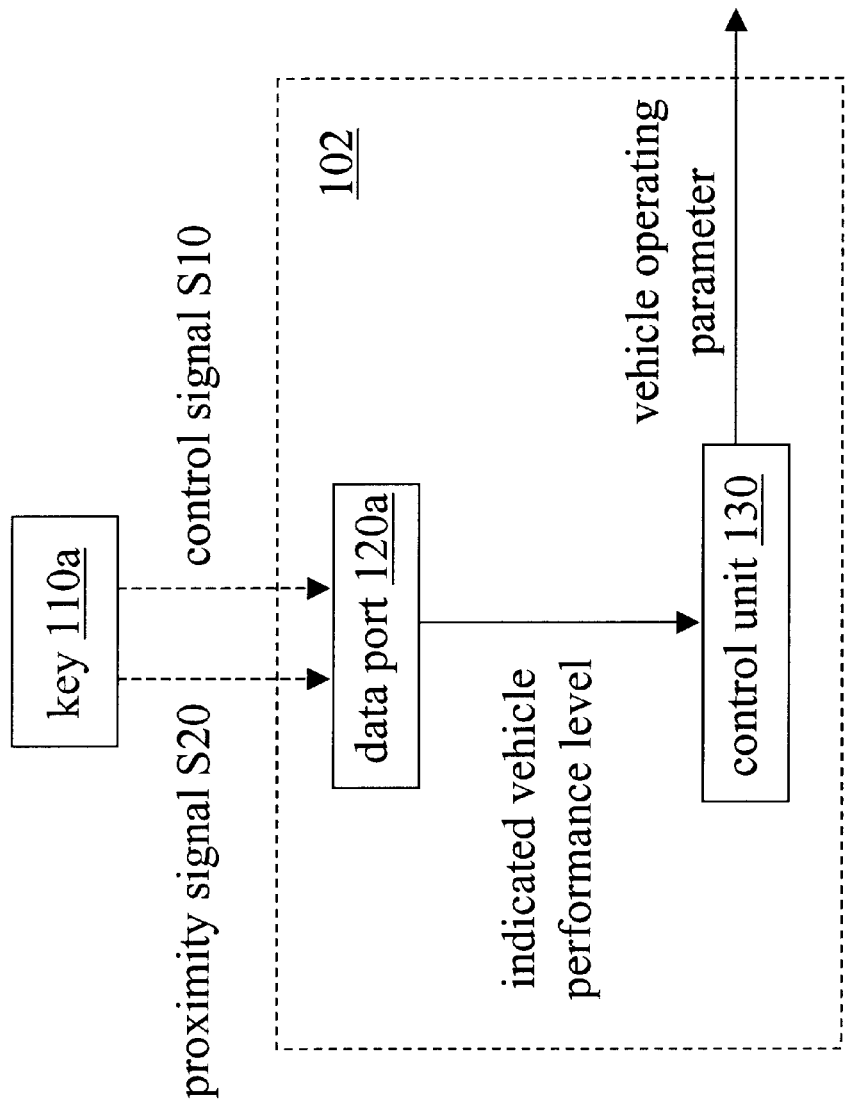
FIG. 8 shows a block diagram of a system according to an embodiment of the invention.

FIG. 8 shows a system according to another embodiment of the invention. In this example, apparatus 102 receives a proximity signal S20 from key 110a in addition to control signal. S10. Proximity signal S20 may comprise a condition of control signal S10 (e.g. an initiation or interruption, or a signal level or bit error rate) or a signal distinct from control signal S10. In one example, proximity signal S20 indicates to apparatus 102 that key 110a has become attached to or is otherwise close to data port 120a. In response to such indication, control unit 130 may query key 110a via data port 120a in order to initiate transmission of the vehicle performance level and/or other information stored on key 110a. In another example, vehicle operation may be prevented and/or suspended until proximity signal S20 is received and forwarded by data port 120a or until such signal reaches or exceeds a predetermined threshold (as determined, e.g., by data port 120a and/or by control unit 130).

Alternatively and/or at another moment, proximity signal S20 may indicate to apparatus 102 that key 110a has become detached from or is otherwise separated from data port 120*a*. In response to such indication, apparatus 102 may affect the operation of the vehicle by such actions as (1) ceasing to provide the vehicle operating parameter, (2) providing a lower vehicle operating parameter than is indicated by the vehicle performance level encoded into key 110*a*, or (3) providing an override signal that may cause the engine of the vehicle to shut down or otherwise reduce performance. The override signal may itself comprise the discontinuation of a signal (such as an engine spark voltage or a fuel supply current).

FIGS. 9A and 9B show pictorial and cross-sectional views, respectively, of an exemplary implementation 120*ai* of data port 120*a*. In this example, proximity signal S20 comprises the actuation of proximity switch 121, which occurs upon the downward movement of plunger 122. Plunger 122, which carries contact 124*a*, may be movable by virtue of a spring-loaded construction or may be constructed of a resilient or otherwise deformable material such as rubber or plastic. FIG. 9C shows a key 110*iv* mounted onto data port 120*ai* (which is itself mounted onto a vehicle surface as shown in FIG. 7A and described above) such that plunger 122 is depressed.

Once mounted upon data port 120*a*, a key 110*a* may be retained in position by friction between an inner surface of key cap 116 and port housing 126. While this retention allows data port 120*a* to continue to receive proximity signal S20, it also allows key 110*a* to be detached from data port 120*a* upon application of a force directed along a straight line in some direction away from data port 120*a* (e.g. through a tether 118 fastened to an anchor 117). For example, key 110*a* may become detached from data port 120*a* in this manner upon a separation of the operator from the vehicle.

Figure 10A:
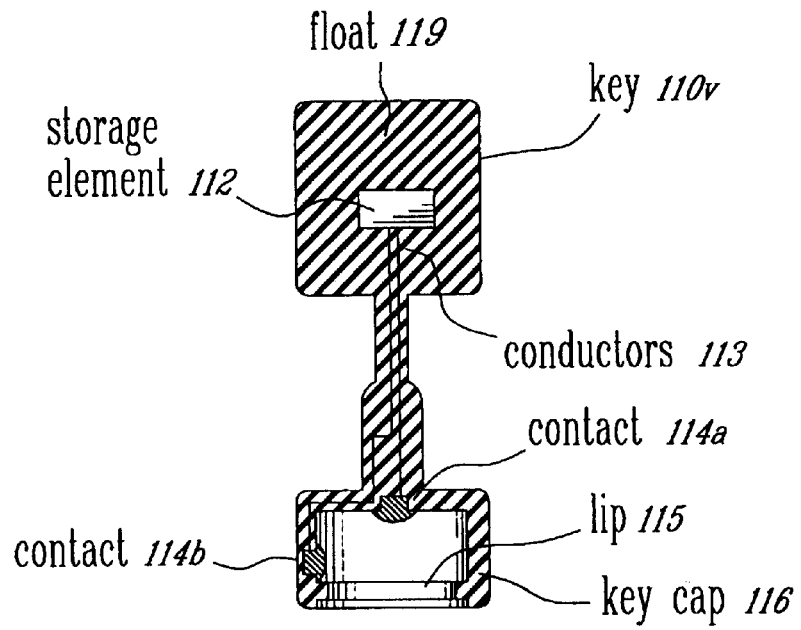
FIG. 10A and 10B show cross-sectional views of a key 110$v$ and a data port 120$aii$ mounted on a vehicle surface, respectively.
Figure 10B:
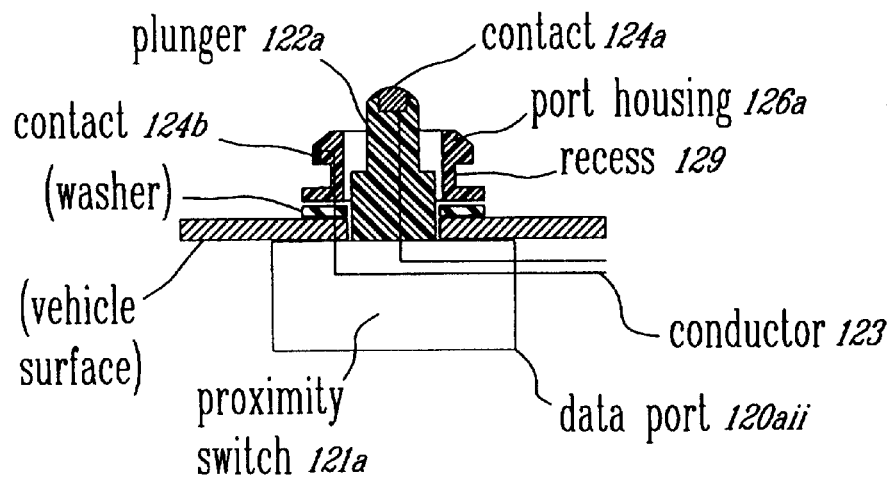

FIG. 10A shows a key 110*v* according to another embodiment of the invention. In this example, key 110*v* includes a circular lip 115 formed on an inner surface of key cap 116*a*. FIG. 10B shows a cross-sectional view of a data port 120*aii* which includes a recess 129. When key 110*v* is mounted onto data port 120*aii*, lip 115 engages recess 129 to provide a secure but detachable mechanical connection between key 110*v* and data port 120*aii*. In another implementation, lip 115 may extend across less than the entire inner circumference of key cap 116*a*. For example, lip 115 may be constructed as one or more tabs that mate with recess 129, which may itself extend across all or less than all of the circumference of port housing 126*a*. Such a limited extension of lip 115 may be used to limit a mating orientation of key 110*v* such that the key will mount onto data port 120*aii* only in a predetermined rotational position or range of positions.

Figure 11:
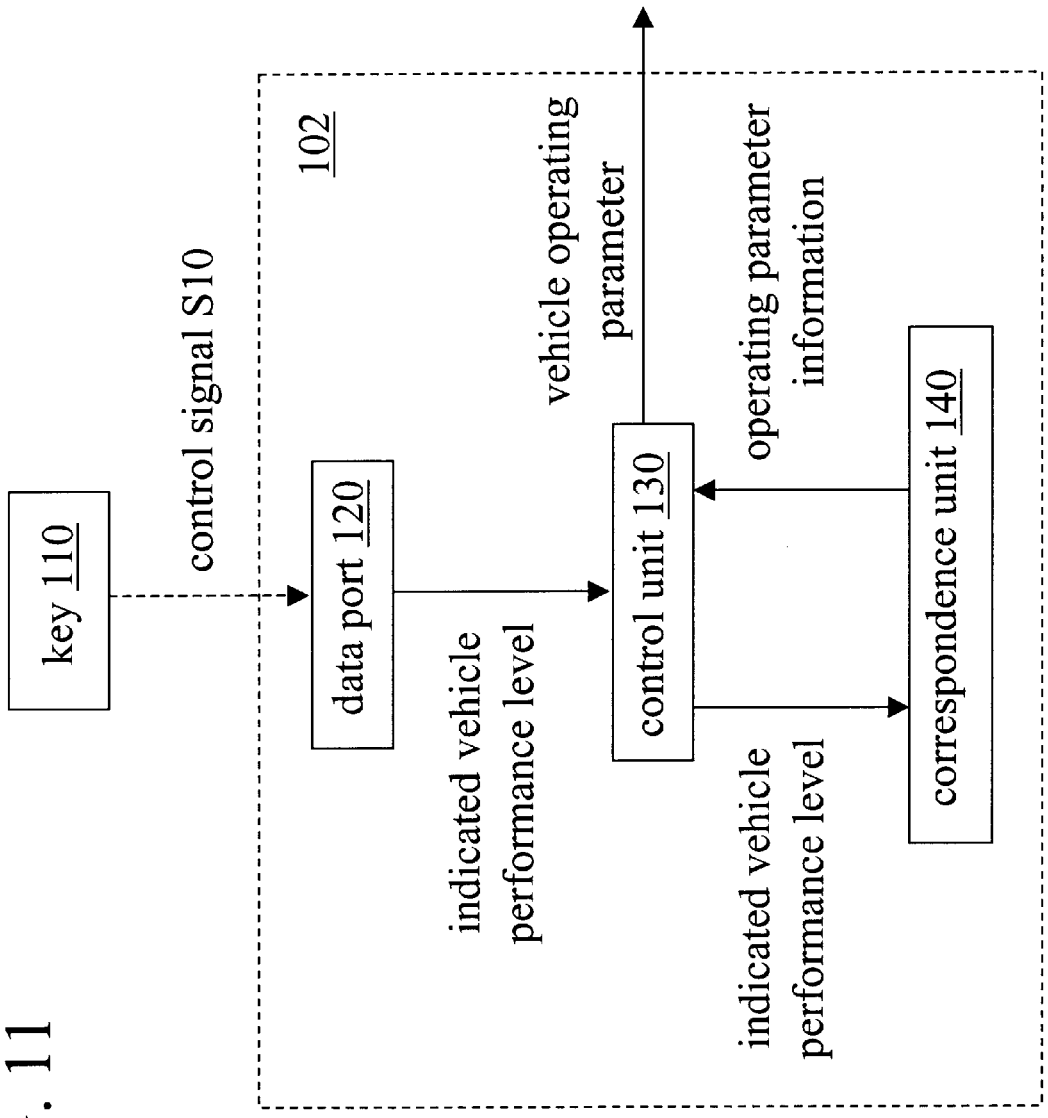
FIG. 11 shows a block diagram of a system according to an embodiment of the invention.

FIG. 11 shows a block diagram of a system for controlling vehicle performance that includes an implementation 102 of apparatus 100. In this example, control unit 130 forwards the indicated vehicle performance level to a correspondence unit 140. In one implementation, correspondence unit 140 comprises a map (stored, for example, in semiconductor RAM or ROM), wherein each row associates a possible vehicle performance level with a corresponding set of operating parameter information. In such case, the indicated vehicle performance level may serve as a row index into the map. In a similar implementation, the indicated vehicle performance level may indicate the address of a particular storage location of correspondence unit 140 at which the corresponding set of operating parameter information is stored. It may be desirable to implement correspondence unit 140 in a nonvolatile storage device in order to retain the correspondences and possibly other information even after power is removed. The correspondences may be stored permanently, or correspondence unit 140 may be programmable.

It may be desirable to obtain a similar performance limiting action in more than one vehicle. Even if a key that transmits engine operating parameters such as RPM to a single vehicle (e.g. a key as discussed in the background section above) were usable in more than one vehicle, however, the results could be quite unexpected and undesirable. For example, a limitation of 3000 RPM could produce very different results with respect to two different vehicles. Because the performance level utilized in a system according to an embodiment of the invention is unitless, however, it is possible to obtain a similar performance limitation in more than one vehicle, regardless of the comparative capabilities of the vehicles. In this case, it is only necessary to coordinate the responses of the correspondence units 140 such that a particular indicated vehicle performance level produces a similar response in all such vehicles.

In an alternate implementation, correspondence unit 140 may translate the indicated vehicle performance level into one or more operating parameters according to another function, such as an analog and/or a linear function. In one such implementation, correspondence unit 140 may multiply the indicated vehicle performance level by a constant factor to obtain a corresponding operating parameter. For example, the indicated vehicle performance level may be multiplied by a constant factor of 1500, such that in response to a signal indicating the unitless vehicle performance level '2', correspondence unit 140 outputs an operating parameter (e.g. an engine operating limit) of 3000 RPM. A vehicle having a different operating profile (e.g. a smaller engine) may be configured with a correspondingly different correspondence unit. For example, the indicated vehicle performance level may be multiplied by a different constant factor of 2500, such that in response to a signal indicating the same unitless performance level '2', the correspondence unit of this vehicle outputs an operating parameter (e.g. an engine operating limit) of 5000 RPM. In such a manner, one key 110 may produce similar levels of performance in vehicles having different operating profiles.

In the embodiment shown in FIG. 11, correspondence unit 140 outputs the operating parameter information to control unit 130, which transmits one or more vehicle operating parameters to the appropriate control mechanisms (e.g. to an ignition control unit, a fuel controller, and/or a steering control unit). In an alternative implementation, the parameters may be supplied directly to the control mechanisms by correspondence unit 140. For example, correspondence unit 140 may receive the indicated vehicle performance level from control unit 130 over an address bus and output the corresponding vehicle operating parameter(s) over a data bus. Alternatively, correspondence unit 140 may receive the indicated vehicle performance level from control unit 130 over an input port and output the corresponding vehicle operating parameter(s) to the appropriate control mechanisms over an output port.

Control unit 130 and correspondence unit 140 may be separate units that communicate over a wired or wireless link and need not be located within the same assembly or in the same area. Alternatively, control unit 130 and correspondence unit 140 may communicate over wires and/or circuit traces as parts of a single assembly. In one implementation, control unit 130 and correspondence unit 140 communicate over a two-wire multiplexed system. In another implementation, a single unit such as an application-specific integrated circuit (ASIC) may comprise both control unit 130 and correspondence unit 140.

Figure 12:
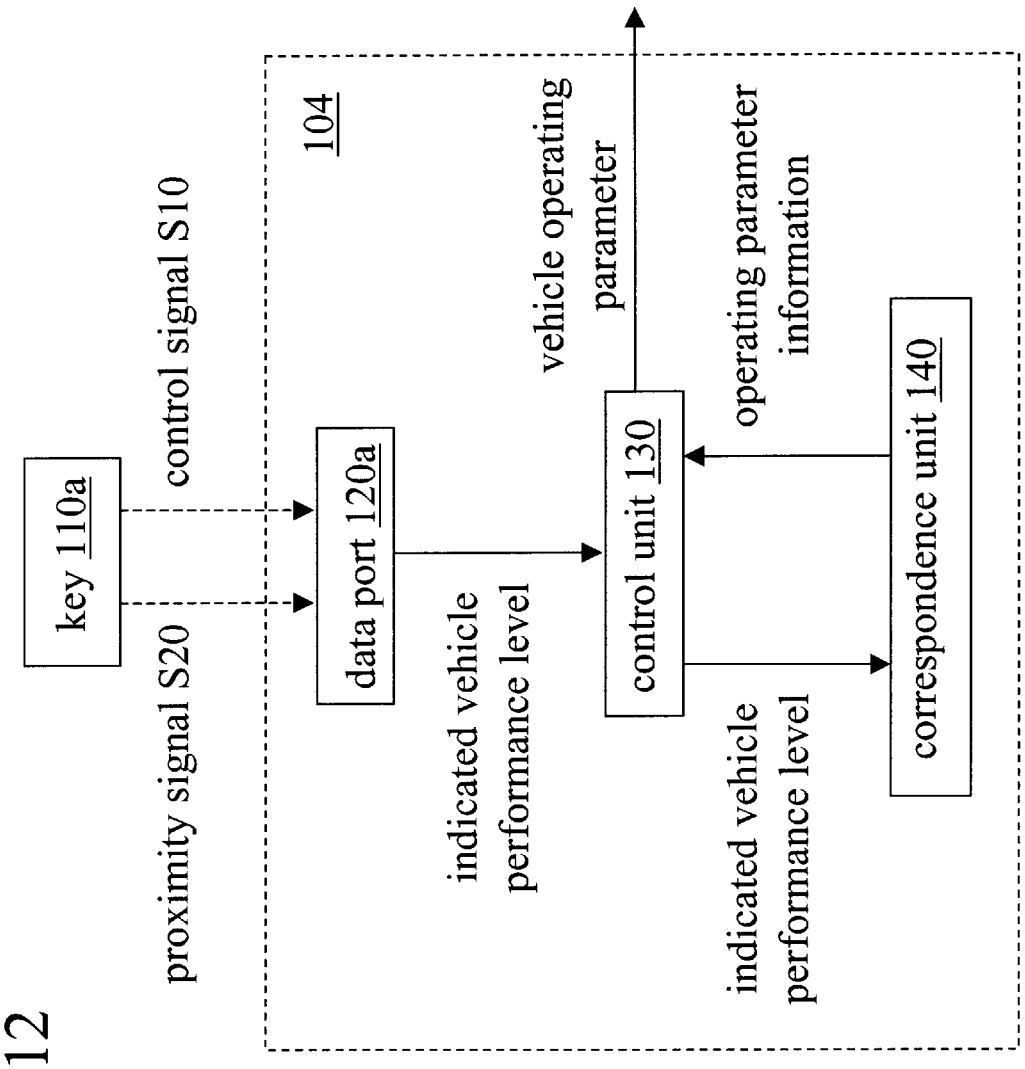
FIG. 12 shows a block diagram of a system according to an embodiment of the invention.
Figure 13:
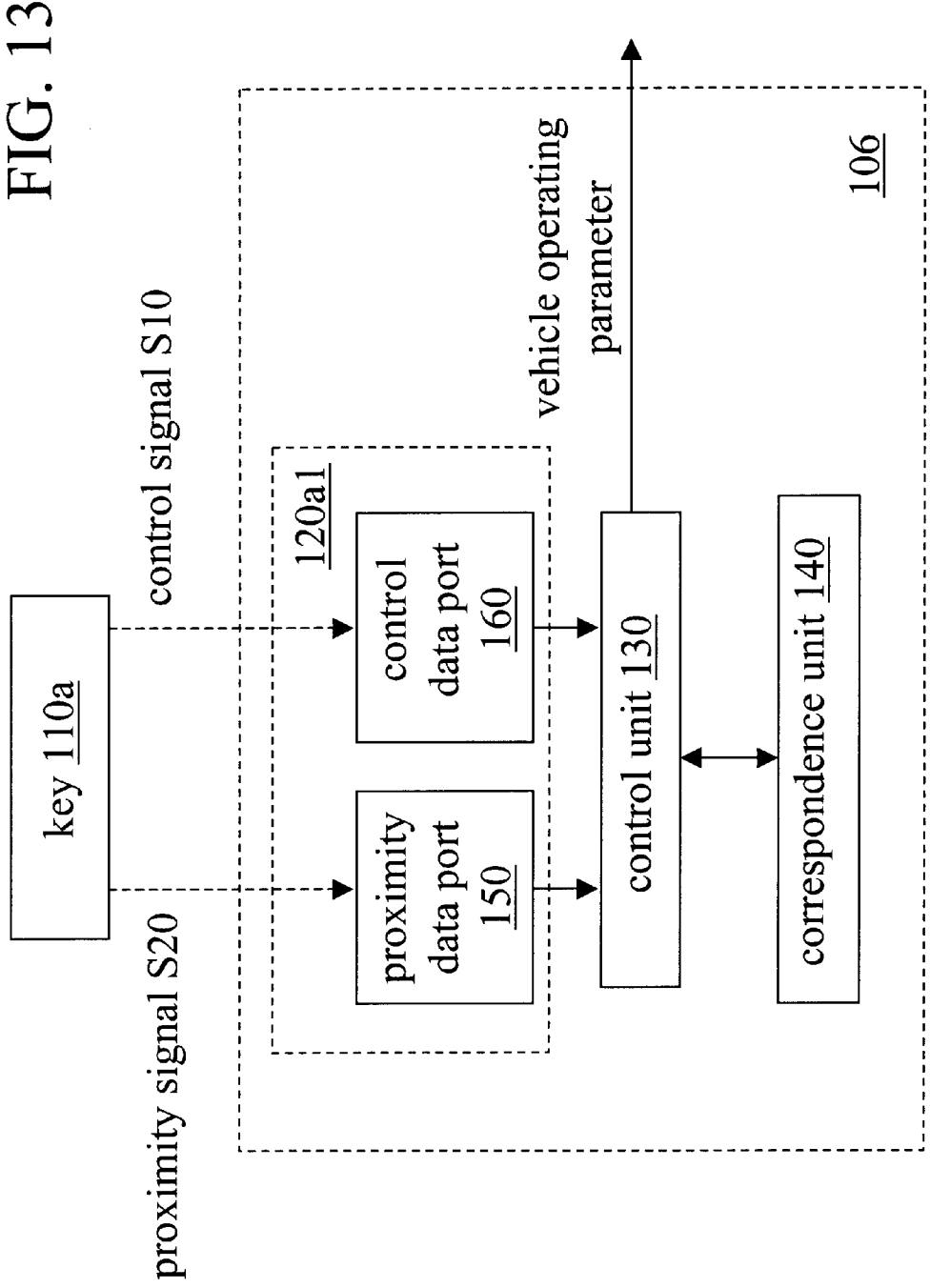
FIG. 13 shows a block diagram of a system according to an embodiment of the invention.

FIG. 12 shows a block diagram of a system according to an embodiment of the invention wherein an implementation 104 of apparatus 100 includes a correspondence unit 140 and a data port 120a that receives a control signal S10 and a proximity signal S20. In an alternative implementation 106 of apparatus 100 as shown in FIG. 13, data port 120a 1 includes different data ports for each signal: proximity data port 150 and control data port 160. For example, proximity signal S20 may be carried over a magnetic link, while control signal S10 may be carried over an electrical or wireless link.

In one such implementation, key 110a includes a magnet, while proximity data port 150 includes a reed switch. Proximity data port 150 and control data port 160 may be constructed within the same port housing 126. Additionally, these two data ports may be connected in series, such that closure of a reed switch of proximity data port 150 (i.e. as caused by a magnet in key 110a) allows control data port 160 to receive the indicated vehicle performance level (and/or other information as described below). The apparatus may also initiate other vehicle activity (e.g. providing power to dashboard gauges and/or lights, vehicle interior illumination, etc.) upon detection of proximity signal S20. In such a case where a circuit is activated upon receipt of proximity signal S20, a time-out period may be provided. For example, the apparatus may be deactivated if the vehicle is not started within ten minutes of the initial receipt of proximity signal S20 (e.g. in order to prevent battery discharge).

Figure 14:
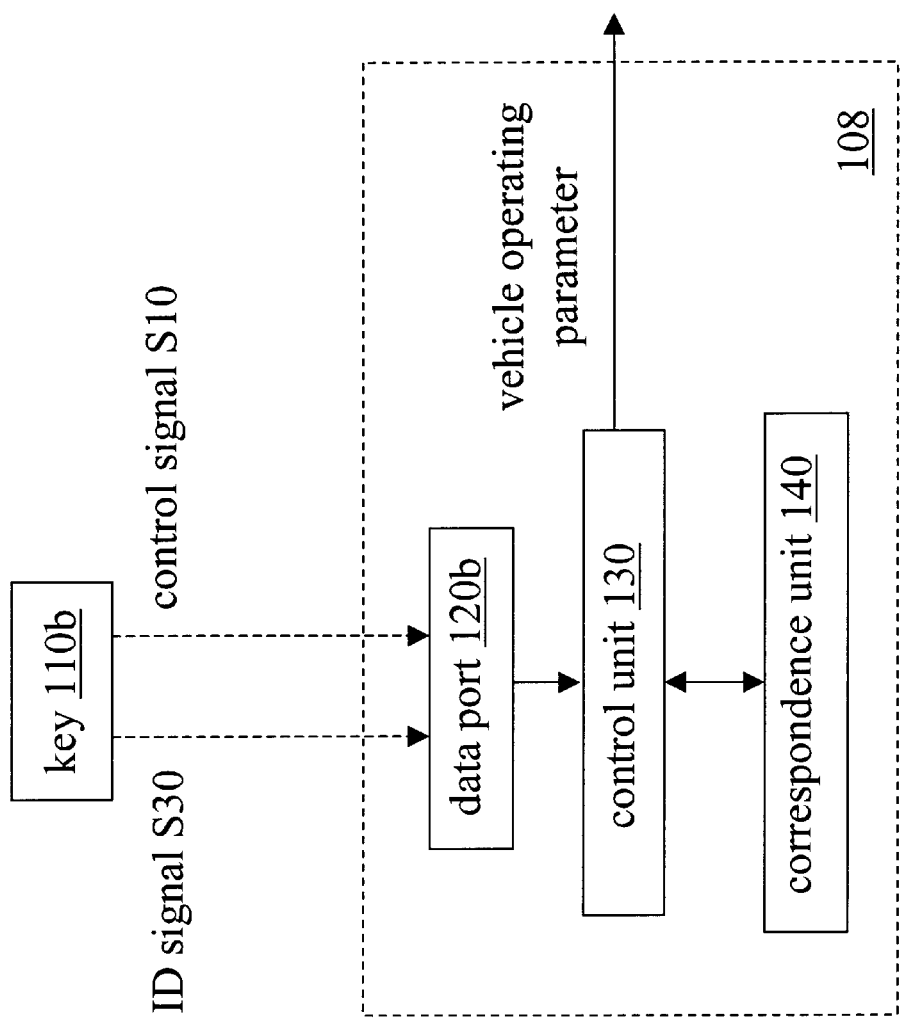
FIG. 14 shows a block diagram of a system according to an embodiment of the invention.
Figure 15:
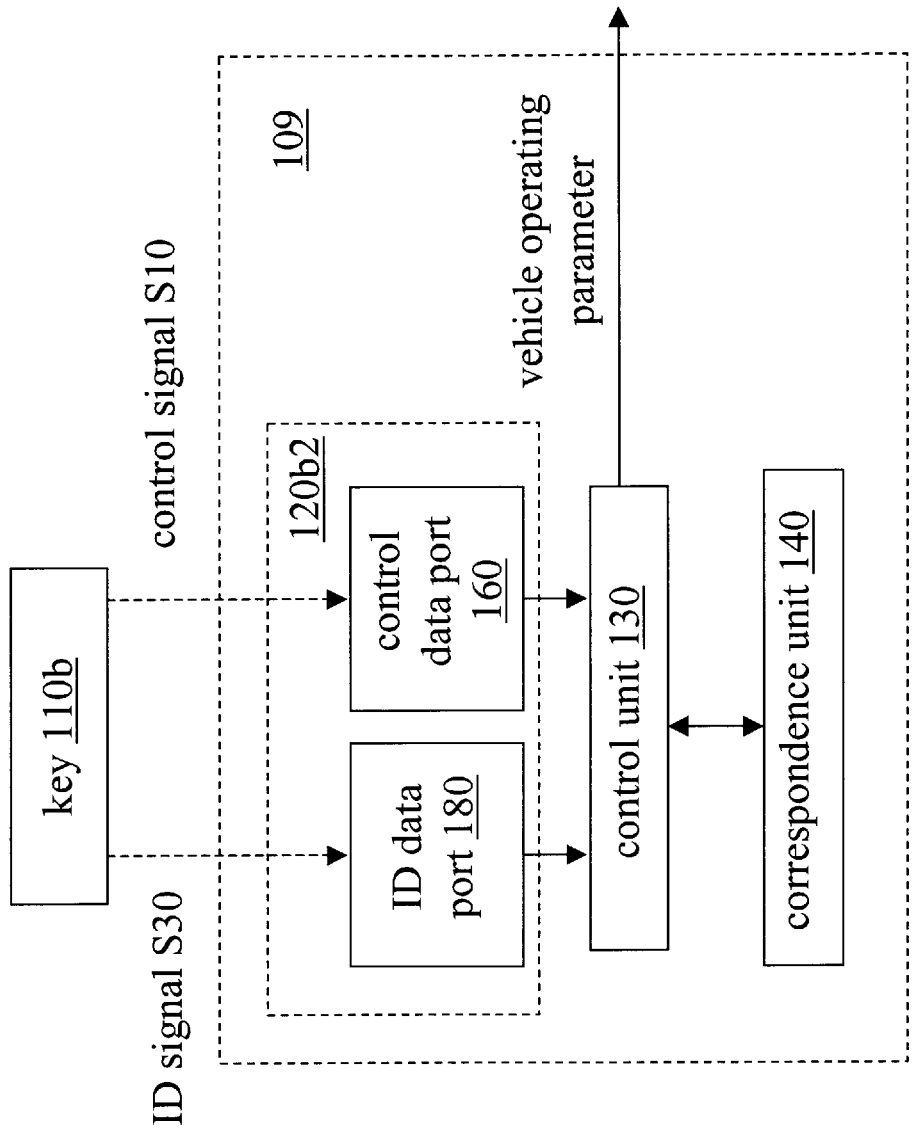
FIG. 15 shows a block diagram of a system according to an embodiment of the invention.

FIG. 14 shows a system according to an embodiment of the invention wherein key 110b communicates control signal S10 and also an identification (or 'ID') signal S30 to an implementation 108 of apparatus 100. The ID signal may contain a code to identify the operator and/or key 110b; alternatively or additionally, the ID code may correspond to the vehicle. The same data port may be used to receive the ID code and performance level information (it is also possible for control signal S10 to carry both the indicated vehicle performance level and the ID code, and indeed a single code may be used to represent both items of information). In an alternative implementation 109 of apparatus 100 as shown in FIG. 15, data port 120b2 may include two different data ports (i.e. ID data port 180 and control data port 160). Other possible implementations include systems wherein a proximity signal and an ID signal, or wherein all three among a control signal, a proximity signal, and an ID signal, are communicated by a key 110.

Vehicle operation may be restricted according to whether the ID code corresponds to information stored in correspondence unit 140. If no such correspondence is found, vehicle operation may be denied completely (for example, a start switch of the vehicle may be disabled) or restricted to a default performance level. In a further implementation, user authentication may be required. For example, correspondence unit 140 may return a password associated with the ID code which must correspond to a key sequence entered by the user via a keypad (e.g. as determined by control unit 130) before the vehicle will function above a predetermined performance level or possibly at all.

In one implementation, correspondence unit 140 may comprise two different areas 140-1 and 140-2 (which may reside in the same storage element) wherein performance level and ID code correspondences may be determined separately. In another implementation, a single code that represents both a performance level and an ID code may be tested for a correspondence in correspondence unit 140. One implementation of apparatus 100 that controls more than one vehicle has a correspondence unit 140a that returns a different set of vehicle operating parameters depending upon both the indicated vehicle performance level and information relating to the ID code.

Apparatus 100 may reside completely on or within the vehicle whose performance it limits. Alternatively, some or all elements of apparatus 100 may reside apart from the vehicle. In an exemplary application, data port 120a (and possibly other elements of apparatus 100) may be positioned at the entrance to a vehicle dock, garage, or corral, and the vehicle operating parameters may be transmitted to the appropriate control mechanisms over a wireless link. Apparatus according to other embodiments of the invention may be formed in similar fashion from corresponding portions of systems as described herein.

A key 110, 110a, or 110b as described herein may be manufactured in quantity both easily and inexpensively. Such a key may indicate one of any desired number of performance levels, and several keys of the same or different levels may be provided for use with the same vehicle. Programmability of ID code information may-be desirable in a key that provides ID code information (for example, key 110b), e.g. for ease of replacement of a lost key. For electrical or wireless operation, key 110b may comprise a nonvolatile medium such as a semiconductor read-only memory (ROM) or a flash random-access memory (RAM) device for storage of the identification code.

In another system according to an embodiment of the invention, an external unit is coupled to data port 120 in place of key 110. In this manner, diagnostic information (such as logged events and/or indicators of current vehicle operation) obtained by control unit 130 may be transferred to the external unit. Alternatively, programming information (e.g. updates to correspondence unit 140) may be passed from the external unit to control unit 130. The external unit may be a portable handheld unit with capabilities limited to information storage, retrieval, and transmittal (e.g. over a datalink to a computer and/or a network). Alternatively, the external unit may also have diagnostic or other processing capabilities. The external unit may also be used to provide a data pathway between control unit 130 and a computer and/or a network. The external unit may also be provided with a data port with which to accept and program key 110 (e.g. to assign a code number to key 110).

Figure 16:
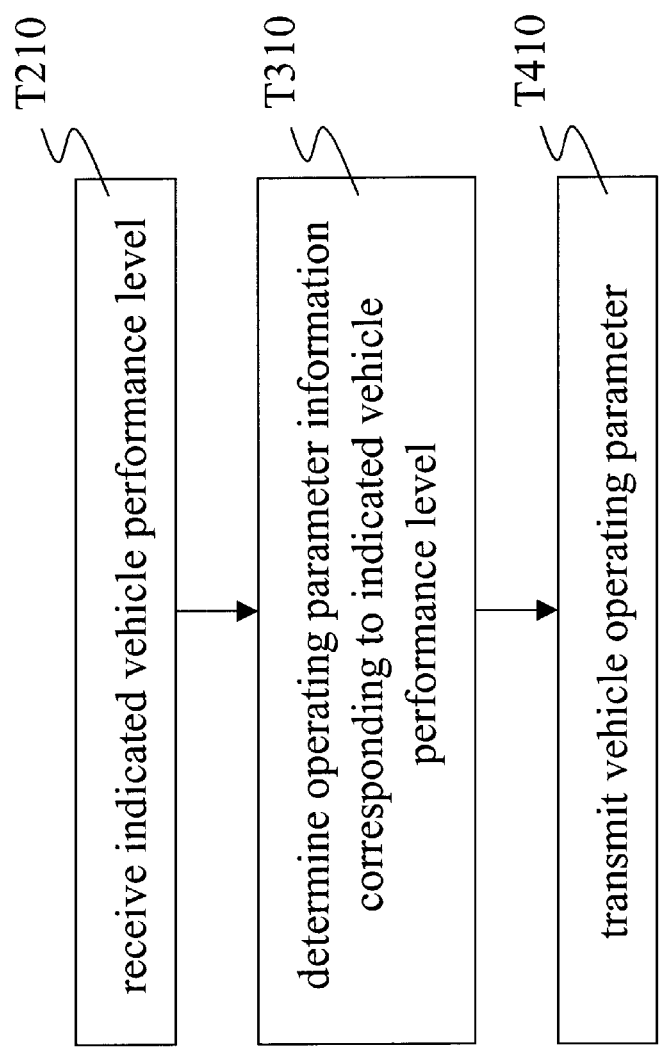
FIG. 16 shows a block diagram of a method according to an embodiment of the invention.

FIG. 16 shows a flowchart for a method according to an embodiment of the invention. In task T210, an indicated vehicle performance level is received (e.g. by a control unit 130 as described herein). In task T310, operating parameter information corresponding to the indicated vehicle performance level is determined. One or more vehicle operating parameters (which are based at least in part on the operating parameter information) are transmitted in task T410.

Figure 17:
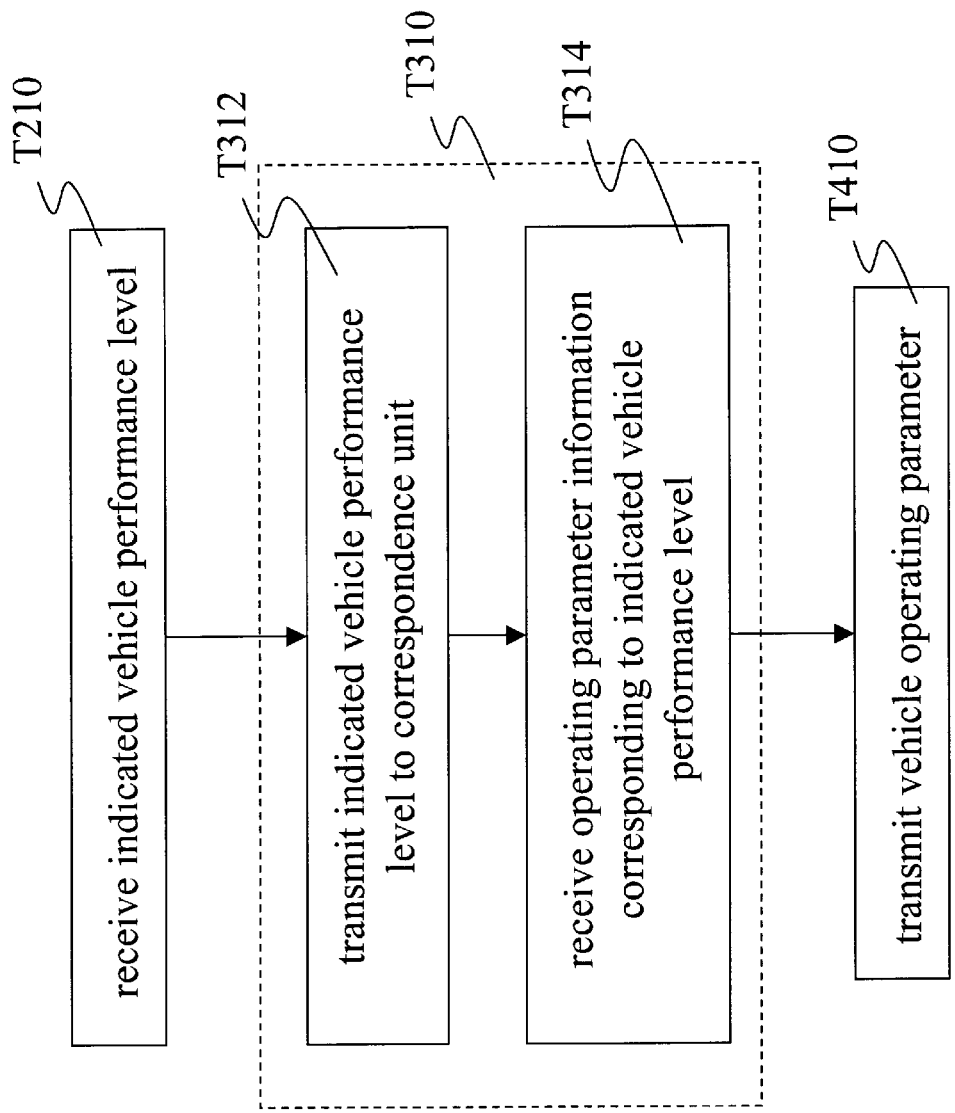
FIG. 17 shows a block diagram of a method according to an embodiment of the invention.

FIG. 17 shows a flowchart for a method according to another embodiment of the invention wherein task T310 includes two subtasks. In subtask T312, the indicated vehicle performance level is transmitted to a correspondence unit (e.g. a correspondence unit 140 as described herein). In subtask T314, operating parameter information corresponding to the indicated vehicle performance level is received from the correspondence unit.

Figure 18:
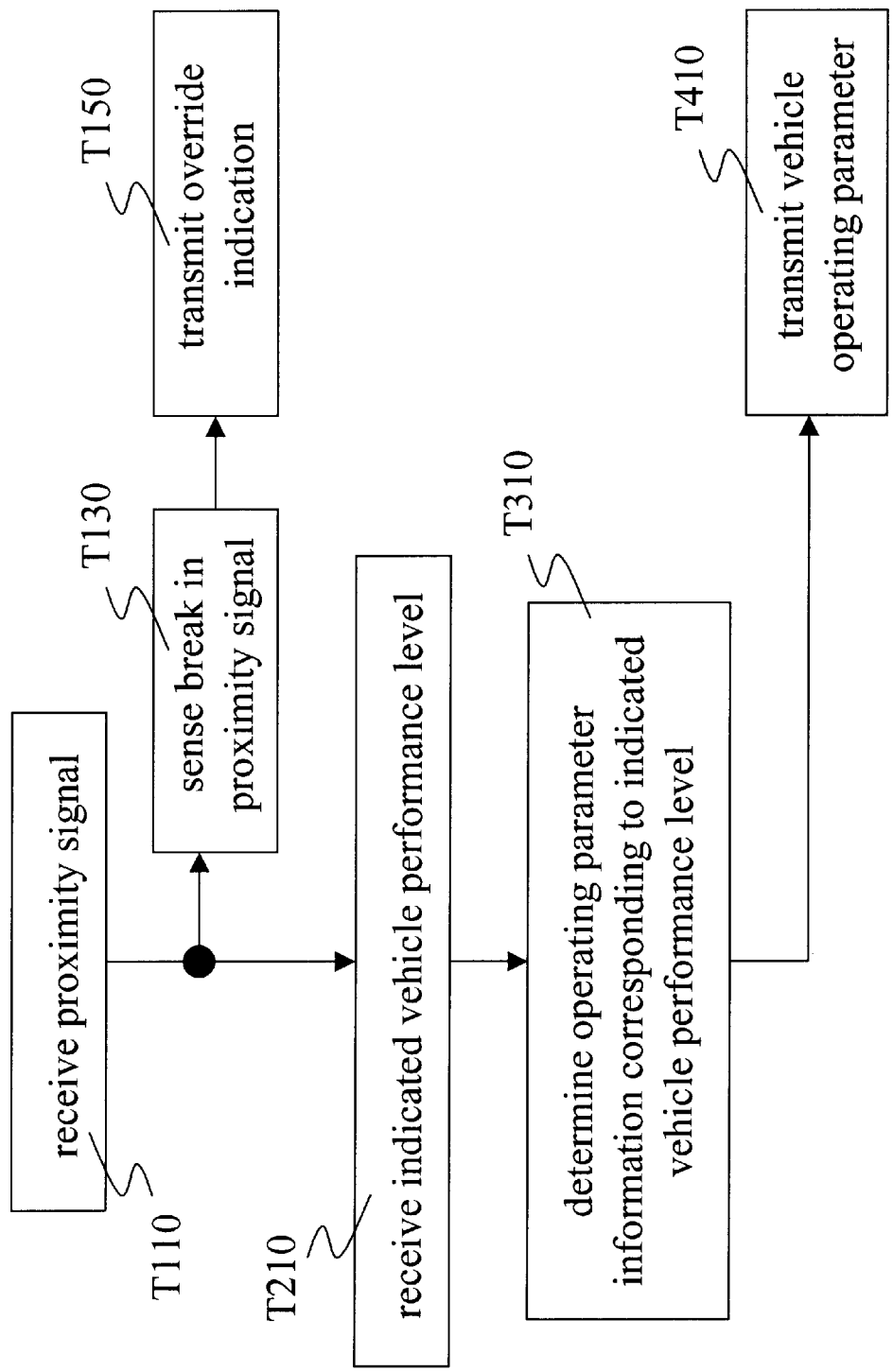
FIG. 18 shows a block diagram of a method according to an embodiment of the invention.
Figure 19:
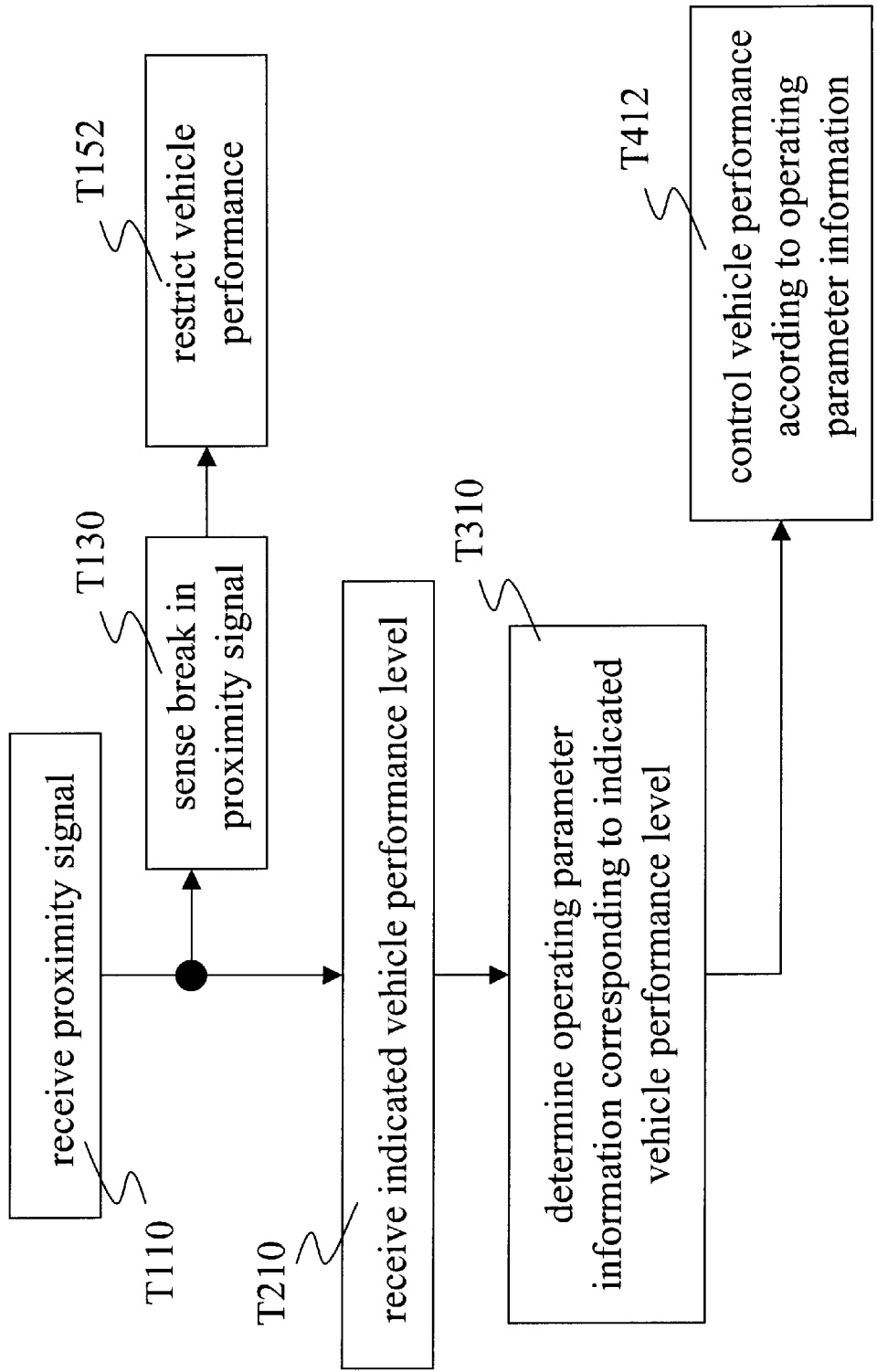
FIG. 19 shows a block diagram of a method according to an embodiment of the invention.

FIG. 18 shows a flowchart for a method according to another embodiment of the invention. In task T110, a proximity signal is received. Tasks T210, T310, and T410. (e.g. as described above) execute subsequently to task T110, while task T130 executes in a parallel branch. If a break in the proximity signal is sensed in task T130, an override indication is transmitted (e.g. to an engine control module) in task T150. FIG. 19 shows a flowchart for a method according to another embodiment of the invention wherein tasks T410 and T150 are replaced by tasks T412 and T152 wherein vehicle performance may be controlled or restricted directly (e.g. by a control unit 130 as described herein) rather than through other control units.

Figure 20:
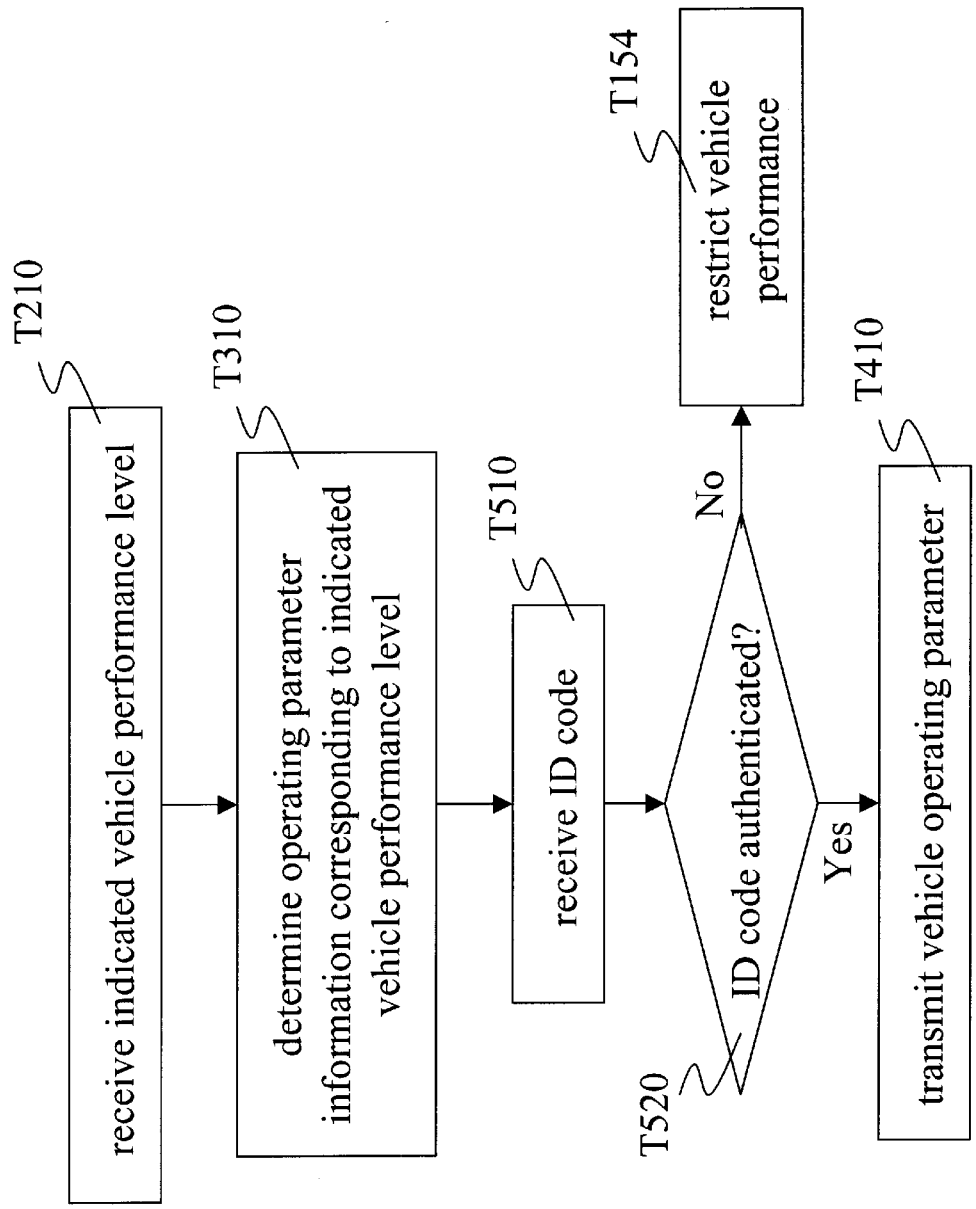
FIG. 20 shows a block diagram of a method according to an embodiment of the invention.

FIG. 20 shows a flowchart for a method according to another embodiment of the invention. In task T510, an ID code is received (e.g. from a key 110b as described herein). If authentication of the ID code fails in task T520 (e.g. because no correspondence to the ID code can be found in a correspondence unit, because no ID code is received, or because a user fails to respond appropriately to an authentication demand), then vehicle performance is restricted in task T154 (either directly or indirectly). For example, vehicle performance may be restricted to a novice level or a "limp-home" level (e.g. by controlling fuel supply or engine speed) or prevented altogether (e.g. by disabling a start switch of the vehicle or by preventing ignition completely). Otherwise, if the authentication test of task T520 succeeds, one or more vehicle operating parameters corresponding to the indicated vehicle performance level and/or the ID code are transmitted in task T410. Different audible and/or visible indications may also be produced depending on the outcome of test task T520.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. An apparatus for controlling vehicle performance, the apparatus comprising:
   a data port configured and arranged to receive a control signal from a key, the signal indicating one among a plurality of discrete and unitless vehicle performance levels; and
   a control unit coupled to the data port and configured and arranged to output a vehicle operating parameter,
   wherein the vehicle operating parameter is based at least in part on operating parameter information corresponding to the indicated vehicle performance level,
   wherein the data port is further configured and arranged to be capable of determining that the key is in proximity to the data port, and
   wherein the apparatus is configured and arranged to restrict an operation of the vehicle upon determining that the key is no longer in proximity to the data port.

2. The apparatus according to claim 1, wherein the data port is further configured and arranged to receive the control signal from the key over an electrical signal path.

3. The apparatus according to claim 1, wherein the data port comprises a plurality of electrical contacts configured and arranged to receive the control signal from the key.

4. The apparatus according to claim 1, wherein the data port is further configured and arranged to receive the control signal from the key over a wireless communications link.

5. The apparatus according to claim 1, wherein the vehicle operating parameter indicates a maximum speed of an engine.

6. The apparatus according to claim 1, wherein the vehicle operating parameter defines a maximum level of fuel supply to an engine.

7. The apparatus according to claim 1, wherein the vehicle operating parameter relates to an operation of a personal recreational vehicle.

8. The apparatus according to claim 1, wherein the vehicle operating parameter relates to an operation of a watercraft.

9. The apparatus according to claim 1, wherein the vehicle operating parameter relates to an operation of a snowmobile.

10. The apparatus according to claim 1, wherein the data port is mounted on a surface of a vehicle.

11. The apparatus according to claim 1, the apparatus further comprising a correspondence unit coupled to the control unit,
    wherein the correspondence unit is configured and arranged to receive the indicated vehicle performance level and to output the operating parameter information.

12. The apparatus according to claim 11, wherein the correspondence unit comprises a map.

13. The apparatus according to claim 11, wherein the correspondence unit comprises a nonvolatile storage device.

14. The apparatus according to claim 13, wherein the correspondence unit comprises a flash random-access memory device.

15. The apparatus according to claim 1, wherein the data port is configured and arranged to receive a proximity signal over a magnetic signal path.

16. The apparatus according to claim 1, wherein the data port comprises a reed switch configured and arranged to receive a proximity signal.

17. The apparatus according to claim 1, wherein the control signal includes an identification code.

18. The apparatus according to claim 17, wherein the control unit is further configured and arranged to output at least one vehicle operating parameter based on a correspondence of the identification code.

19. The apparatus according to claim 17, the apparatus further comprising a second control unit configured and arranged to output at least one vehicle operating parameter based on a correspondence of the identification code.

20. The apparatus according to claim 1, wherein the data port is further configured and arranged to receive an identification signal from the key, the identification signal including an identification code.

21. The apparatus according to claim 20, wherein the control unit is further configured and arranged to output at least one vehicle operating parameter based on a correspondence of the identification code.

22. The apparatus according to claim 20, the apparatus further comprising a second control unit configured and arranged to output at least one vehicle operating parameter based on a correspondence of the identification code.

23. The apparatus according to claim 1, the apparatus further comprising a second data port configured and arranged to receive an identification signal from the key, the identification signal including an identification code.

24. The apparatus according to claim 23 wherein the control unit is further configured and arranged to output at least one vehicle operating parameter based on a correspondence of the identification code.

25. The apparatus according to claim 23, the apparatus further comprising a second control unit configured and arranged to output at least one vehicle operating parameter based on a correspondence of the identification code.

26. A method of controlling vehicle performance, the method comprising:
   determining that a key is in proximity to a data port;
   subsequent to determining that the key is in proximity to the data port, receiving an indicated vehicle performance level from the key, the indicated vehicle performance level being one among a plurality of discrete and unitless vehicle performance levels;
   transmitting the indicated vehicle performance level to a correspondence unit;
   determining operating parameter information corresponding to the indicated vehicle performance level;
   receiving the operating parameter information from the correspondence unit; and
   transmitting a vehicle operating parameter based at least in part on the operating parameter information.

27. The method according to claim 26, the method further comprising restricting vehicle performance upon determining that the key is no longer in proximity to the data port.

28. A method of controlling vehicle performance, the method comprising:
   determining that a key is in proximity to a data port;
   subsequent to determining that the key is in the proximity of the data port, receiving an indicated vehicle performance level from the key, the indicated vehicle performance level being one among a plurality of discrete and unitless vehicle performance levels;
   determining operating parameter information corresponding to the indicated vehicle performance level;
   transmitting vehicle operating parameters based at least in part on the operating parameter information;
   receiving an identification code from the key; and
   transmitting at least one of the vehicle operating parameters additionally based on a correspondence of the identification code.

29. The method according to claim 28, the method further comprising restricting vehicle performance upon interruption of the proximity signal.

30. An apparatus for controlling vehicle performance, the apparatus comprising:
   a data port configured and arranged to receive a control signal from a key, the signal indicating one among a plurality of vehicle performance levels; and
   a control unit coupled to the data port and configured and arranged to output a vehicle operating parameter,
   wherein the vehicle operating parameter is based at least in part on operating parameter information corresponding to the indicated vehicle performance level, and
   wherein the data port comprises a structure configured and arranged to detachably retain the key, and
   wherein the data port is further configured and arranged to release the key upon application of a force directed at least partially away from the apparatus while an engine of the vehicle is operating.

31. The apparatus according to claim 30, wherein the data port is further configured and arranged to receive the control signal from the key over an electrical signal path.

32. The apparatus according to claim 30, wherein the data port comprises a plurality of electrical contacts configured and arranged to receive the control signal from the key.

33. The apparatus according to claim 30, wherein the data port is further configured and arranged to receive the control signal from the key over a wireless communications link.

34. The apparatus according to claim 30, wherein the vehicle operating parameter indicates a maximum speed of an engine.

35. The apparatus according to claim 30, wherein the vehicle operating parameter defines a maximum level of fuel supply to an engine.

36. The apparatus according to claim 30, wherein the vehicle operating parameter relates to an operation of a personal recreational vehicle.

37. The apparatus according to claim 30, wherein the vehicle operating parameter relates to an operation of a watercraft.

38. The apparatus according to claim 30, wherein the vehicle operating parameter relates to an operation of a snowmobile.

39. The apparatus according to claim 30, wherein the data port is mounted on a surface of a vehicle.

40. The apparatus according to claim 30, the apparatus further comprising a correspondence unit coupled to the control unit,
   wherein the correspondence unit is configured and arranged to receive the indicated vehicle performance level and to output the operating parameter information.

41. The apparatus according to claim 40, wherein the correspondence unit comprises a map.

42. The apparatus according to claim 40, wherein the correspondence unit comprises a nonvolatile storage device.

43. The apparatus according to claim 42, wherein the correspondence unit comprises a flash random-access memory device.

44. The apparatus according to claim 30, wherein the data port is further configured and arranged to capable of determining whether the key is in proximity to the data the data port, and
   wherein the apparatus is configured and arranged to restrict an operation of the vehicle upon determining that the key is no longer in proximity to the data port.

45. The apparatus according to claim 44, wherein the data port is configured and arranged to receive a proximity signal over a magnetic signal path.

46. The apparatus according to claim 44, wherein the data port comprises a reed switch configured and arranged to receive a proximity signal.

47. The apparatus according to claim 30, wherein the data port is configured and arranged to release the key upon application of a force directed in a straight line and away from the apparatus while an engine of the vehicle is operating.

48. The apparatus according to claim 30, wherein the control signal includes an identification code.

49. The apparatus according to claim 48, wherein the control unit is further configured and arranged to output at least one vehicle operating parameter based on a correspondence of the identification code.

50. The apparatus according to claim 48, the apparatus further comprising a second control unit configured and arranged to output at least one vehicle operating parameter based on a correspondence of the identification code.

51. The apparatus according to claim 50, wherein the data port is further configured and arranged to receive an identification signal from the key, the identification signal including an identification code.

52. The apparatus according to claim 51, wherein the control unit is further configured and arranged to output at least one vehicle operating parameter based on a correspondence of the identification code.

53. The apparatus according to claim 51, the apparatus further comprising a second control unit configured and arranged to output at least one vehicle operating parameter based on a correspondence of the identification code.

54. The apparatus according to claim 50, the apparatus further comprising a second data port configured and arranged to receive an identification signal from the key, the identification signal including an identification code.

55. The apparatus according to claim 54, wherein the control unit is further configured and arranged to output at least one vehicle operating parameter based on a correspondence of the identification code.

56. The apparatus according to claim 54, the apparatus further comprising a second control unit configured and arranged to output at least one vehicle operating parameter based on a correspondence of the identification code.

57. The apparatus according to claim 30, wherein the signal indicates one among a plurality of discrete and unitless vehicle performance levels.

58. The apparatus according to claim 30, wherein the structure configured and arranged to detachably retain the key is a surface configured and arranged to detachably retain the key.

* * * * *